310-800 SR

XR 3,816,774

United States Patent [19]

Ohnuki et al.

[11] 3,816,774

[45] June 11, 1974

[54] CURVED PIEZOELECTRIC ELEMENTS

[75] Inventors: Katuhiro Ohnuki, Tokyo; Kazuhiro Sato, Yamato-City; Shin Miyajima, Sagamihara-City; Hideo Suyama, Yokohama, all of Japan

[73] Assignee: Victor Company of Japan, Ltd., Yokohama City, Kanagawa-ken, Japan

[22] Filed: Jan. 29, 1973

[21] Appl. No.: 327,777

[30] Foreign Application Priority Data

| | | |
|---|---|---|
| Feb. 17, 1972 | Japan | 47-19555 |
| Jan. 28, 1972 | Japan | 47-10402 |
| Jan. 28, 1972 | Japan | 47-10403 |
| Jan. 28, 1972 | Japan | 47-10404 |
| Jan. 28, 1972 | Japan | 48-10406 |
| Jan. 29, 1972 | Japan | 47-10790 |
| Feb. 2, 1972 | Japan | 47-11367 |
| Feb. 29, 1972 | Japan | 47-20241 |
| Mar. 7, 1972 | Japan | 47-23345 |
| Mar. 14, 1972 | Japan | 47-25278 |
| Feb. 17, 1972 | Japan | 47-19556 |

[52] U.S. Cl. .................... 310/8.6, 310/9.5, 310/9.6, 310/9.8

[51] Int. Cl. .................... H04r 17/00

[58] Field of Search .................... 310/8.3, 8.5, 8.6, 9.5, 310/9.6, 9.8

[56] References Cited

UNITED STATES PATENTS

| | | | |
|---|---|---|---|
| 2,928,069 | 3/1960 | Petermann | 310/9.6 X |
| 3,365,592 | 1/1968 | Krautwald et al. | 310/8.5 |
| 3,543,059 | 11/1970 | Angeloff | 310/9.6 X |

*Primary Examiner*—J. D. Miller
*Assistant Examiner*—Mark O. Budd
*Attorney, Agent, or Firm*—Holman & Stern

[57] ABSTRACT

A curved piezoelectric element comprises at least one piezoelectric piece of sheet formed into a wave shape which deforms when a voltage is applied thereto. The wave shape of the piezoelectric piece comprises essentially at least two half-waves connected contiguously and consecutively in one body.

10 Claims, 26 Drawing Figures

FIG. 8
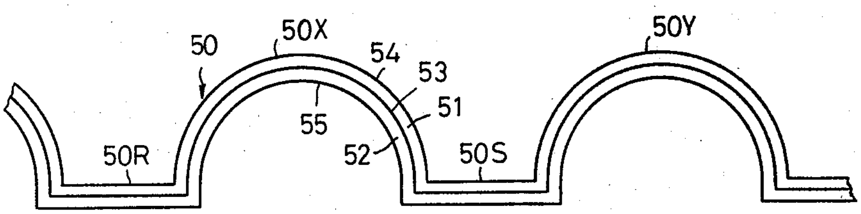
FIG. 9
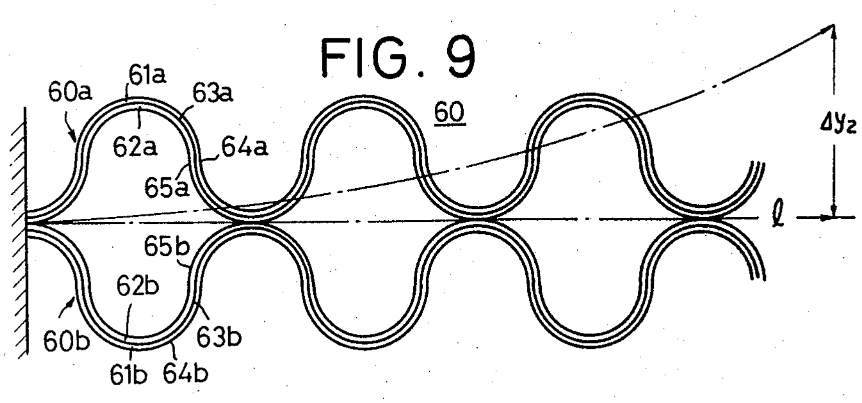
FIG. 10A FIG. 10B
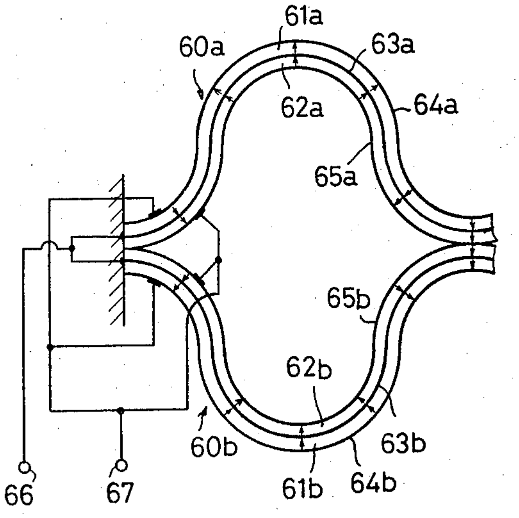
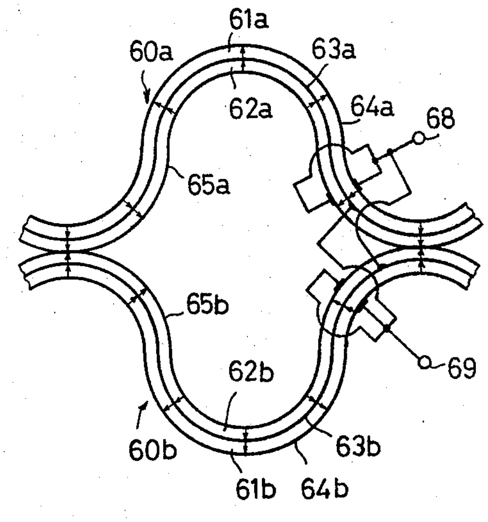

FIG. 14
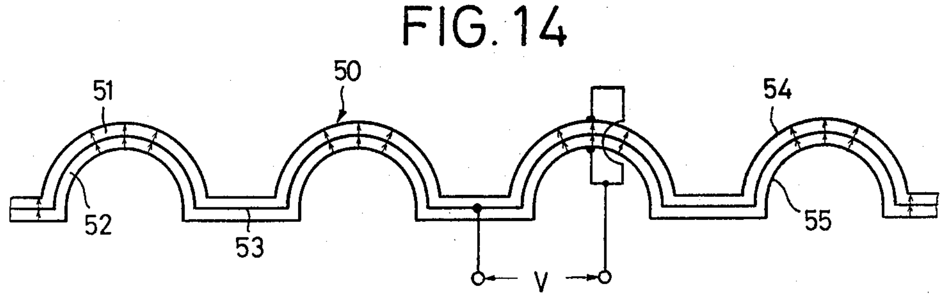
FIG. 16A
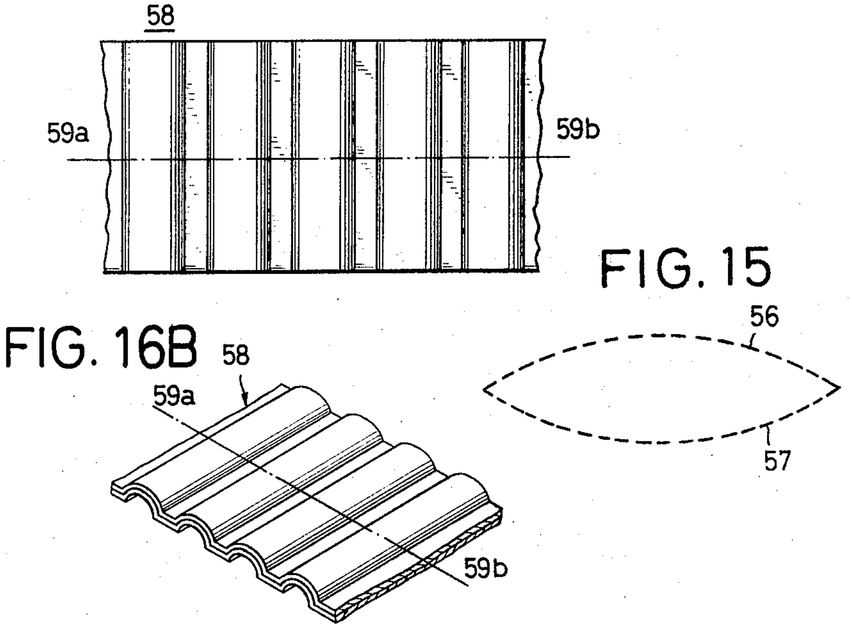
FIG. 15, FIG. 16B
FIG. 17
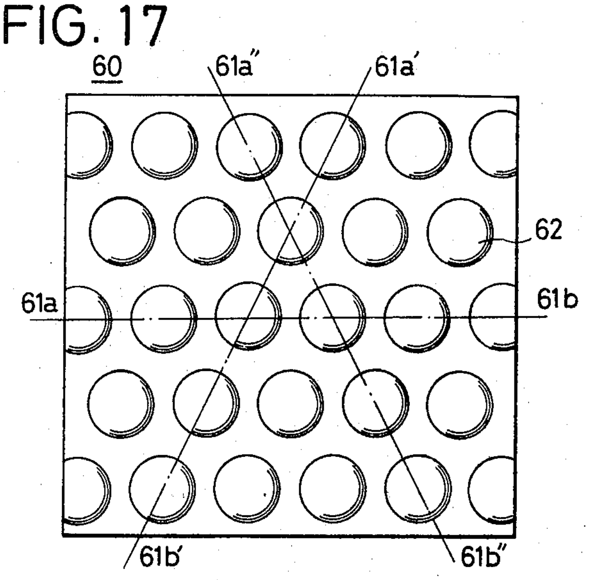

CURVED PIEZOELECTRIC ELEMENTS

BACKGROUND OF THE INVENTION

The present invention relates generally to curved piezoelectric elements and more particularly to curved piezoelectric elements wherein piezoelectric pieces are formed into wave shapes thereby to obtain large displacements of the elements when voltages are applied thereto.

Heretofore, piezoelectric elements such as bimorphs have been of the form of a flat plate in the their state prior to impressing of voltage thereon. When a voltage is applied to the terminal of a bimorph of this flat-plate type thereby to cause it to deform, a large displacement of the bimorph due to the resulting deformation cannot be obtained as described hereinafter. This has been a drawback of this type of bimorph.

On one hand, the use of piezoelectric elements for the diaphragms of loudspeakers is recently being considered. When piezoelectric elements are used for diaphragms, loudspeakers of flat shape, cylindrical shape, and other shapes can be readily constructed.

However, when a conventional piezoelectric element of flat shape is used for this loudspeaker diaphragm, a sufficiently high sound pressure cannot be attained since the displacement due to deformation of the element is small as mentioned above.

Accordingly, in order to overcome the above described difficulty accompanying known piezoelectric elements the present invention contemplates forming piezoelectric structures into a wave form while they are in a state wherein a voltage is not being applied to their electrodes thereby to render them into a piezoelectric element of curved shape.

SUMMARY OF THE INVENTION

It is a general object of the present invention to provide novel and useful piezoelectric elements wherein the difficulties accompanying known piezoelectric elements are overcome.

More specifically, an object of the invention is to provide curved piezoelectric elements each comprising piezoelectric pieces or sheets which are previously curved into wave forms thereby to obtain a large displacement due to deformation of the element when a voltage is applied to electrodes thereof.

Another object of the invention is to provide curved piezoelectric elements suitable for application particularly as diaphragms of loudspeakers to obtain high sound pressures.

Further objects and features of the invention will be apparent from the following detailed description with respect to preferred embodiments of the invention when read in conjunction with the accompanying drawings, throughout which like parts are designated by like reference numerals and characters.

BRIEF DESCRIPTION OF THE DRAWINGS

In the drawings:

FIG. 8 is a longitudinal section showing a fourth embodiment of a curved piezoelectric element of the invention;

FIG. 9 is a longitudinal section showing a fifth embodiment of a curved piezoelectric element of the invention;

FIGS. 10A and 10B are longitudinal sections indicating the manner in which one part of the curved piezoelectric element shown in FIG. 9 deforms and deflects;

FIG. 14 is a longitudinal section indicating the case where the curved piezoelectric element shown in FIG. 8 is used as a loudspeaker diaphragm;

FIG. 15 is a graphical diagram indicating the vibration amplitude of a vibrating diaphragm;

FIGS. 16A and 16B are respectively plan and perspective views showing a first embodiment of a loudspeaker diaphragm having a section of the shape shown in FIG. 14;

FIG. 17 is a plan view showing a second embodiment of a loudspeaker diaphragm having sections each of the shape shown in FIG. 14;

DETAILED DESCRIPTION

Figure 1:
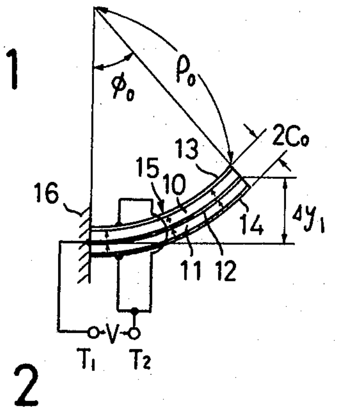
FIG. 1 is a diagrammatic side view, in longitudinal section, showing a known piezoelectric element in deflected state due to deformation.

In one embodiment of a conventional piezoelectric element as shown in FIG. 1, the essential structure thereof comprises two piezoelectric sheets or pieces 10 and 11 and a central electrode 12 interposed therebetween and adhering to the two piezoelectric pieces. The piezoelectric pieces 10 and 11 are polarized upward in the thickness direction thereof as indicated by arrows. The upper surface of the piezoelectric piece 10 and the lower surface of the piezoelectric piece 11 are respectively provided with electrodes 13 and 14 adhering thereto. These piezoelectric pieces 10 and 11 and electrodes 12, 13, and 14 constitute a bimorph 15 fixed at its left end, as viewed in FIG. 1, to a rigid structure 16, thereby being in a cantilever state.

Then, when a voltage V is applied across the electrodes 13 and 14 through terminals T1 and T2, the piezoelectric piece 10 contract, while the piezoelectric piece 11 elongates. As a result, the bimorph deflects to assume a curved shape as indicated in FIG. 1, and the free end thereof is displaced upward. By denoting the quantity of contraction of the piezoelectric piece 10 and the quantity of elongation of the piezoelectric piece 11 by $|\Delta lo|$ and the original length of each of these pieces 10 and 11 by $lo$, the following relationship is obtained.

$$|\Delta lo| = |lo \cdot d_{31} \cdot V/Co| \qquad (1)$$

where $d_{31}$ is the piezoelectric modulus of the piezoelectric pieces, and $Co$ denotes the thickness of each of these piezoelectric pieces 10 and 11.

Furthermore, in terms of the average radius of curvature $\rho o$ of the bimorph deflected in an arcuate state and the central angle $\phi o$, $$(\rho o + Co/2)\ \phi o = lo + lod_{31}V/2Co \qquad (2a)$$

with respect to the piezoelectric piece 10 and $$(\rho o - Co/2)\ \phi o = lo - lod_{31}V/2Co \qquad (2b)$$

with respect to the piezoelectric piece 11. When $\rho o$ and $\phi o$ are determined from the above Equations (2*a*) and 2*b*), $$\rho o = C^2 o/d_{31}V \qquad (3)$$

$$\phi o = lo/Co^2\ d_{31}V \qquad (4)$$

The displacement $y1$ of the free end of the bimorph due the curvature can be calculated as follows.

$$\Delta y1 = lo/\phi o\ (1 - \cos\ \phi o) = lo/\phi o \cdot 2\sin^2\ \phi o/2 \approx lo/2 \cdot 2 \cdot (\phi o/2)^2 = lo\phi o/2 \qquad (5)$$

By substituting this Equation (5) in Equation (4), the following relationship is obtained.

$$\Delta y1 \approx lo/2 \cdot lo/Co^2\ d_{31}V = lo^2/2Co^2 \cdot d_{31}V \qquad (6)$$

As one example to indicate the order of magnitude of this displacement $y1$, the following specific quantitative values will be substituted in the above Equation (6).

$lo = 10^{-1}$ meter (m), $Co = 10^{-4}$(m)

$d_{31} = {}^{-12}$(C/N), $V = 10^2$(V)

As a result, $\Delta y1 \approx 50$ microns is obtained. This indicates that, by the use of a known piezoelectric elements of the above described organization, only a very small displacement can be obtained.

The present invention contemplates overcoming such difficulties accompanying known piezoelectric elements and providing piezoelectric elements capable of producing large displacements as described hereinbelow with respect to a number of embodiments constituting preferred embodiments of the invention.

Figure 2:
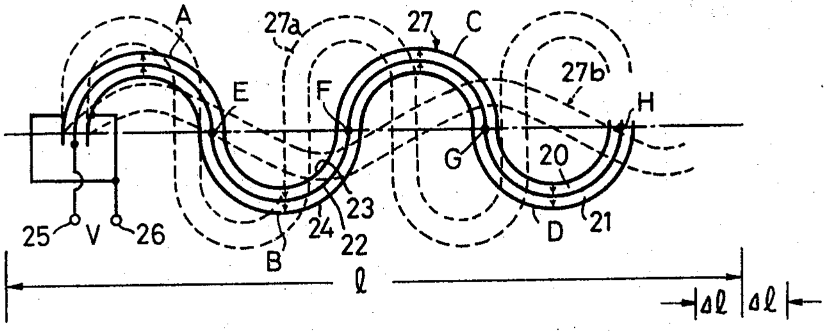
FIG. 2 is a similar longitudinal section showing a first embodiment of a curved piezoelectric element according to the invention.

In a first embodiment shown diagrammatically in FIG. 2 of a curved piezoelectric element according to the present invention, the essential constitutional parts thereof are two piezoelectric pieces 20 and 21, a central electrode 22 sandwiched adhesively therebetween, and electrodes 23 and 24 bonded respectively to the upper surface of the piezoelectric piece 20 and the lower surface of the piezoelectric piece 21 as viewed in FIG. 2. The piezoelectric pieces 20 and 21 are so formed that they have a wave form, as viewed in longitudinal section, wherein semicircular parts thereof A, B, C, D, . . . are alternately disposed and consecutively joined in one body. The central electrode 22 is electrically connected to a terminal 25, while the electrodes 23 and 24 are connected to a terminal 26. A voltage V is applied across the terminals 25 and 26. The above described essential piezoelectric pieces 20 and 21 are electrodes 22, 23, and 24 constitute a bimorph 27.

The piezoelectric pieces 20 and 21 are polarized as indicated by arrows in the outward direction of the semicircular parts A, B, C, D, . . . forming wave forms. Accordingly, at the parts of juncture of these semicircular parts, i.e., inflection points, the polarization direction is inverted.

When one of the piezoelectric pieces 20 and 21 contracts, dependent on the polarity of the voltage applied on the terminals 25 and 26, the other piece elongates. For example, in the semicircular parts A and C, the piezoelectric piece 21 elongates when the piezoelectric piece 20 contracts, and, as a result, the curvatures of the semicircular parts A and C increase. On the other hand, in the semicircular parts B and D, the piezoelectric piece 20 elongates, while the piezoelectric piece 21 contracts with the result that the radii of curvature of the semicircular parts B and D also increase. Consequently, the bimorph 27 assumes a state as indicated by intermittent line **27*a* in FIG. 2. When the polarity of the voltage applied on the terminals 25 and 26 is reversed, the bimorph 27 assumes the state indicated by the intermittent line 27*b***, the entire wave form being laterally spread.

Figure 3A:
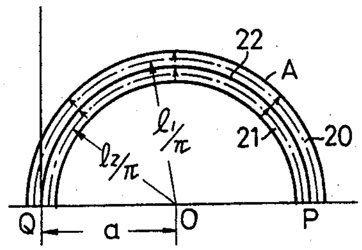
FIGS. 3A and 3B are similar longitudinal sections indicating the deflection or displacement due to deformation of one part of the curved piezoelectric element shown in FIG. 2.
Figure 3B:
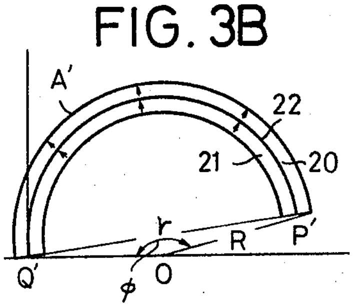

The states of the semicircular part A before and after deformation are indicated in FIGS. 3A and 3B. Here, the average length $l1$ and $l2$ of the piezoelectric pieces 20 and 21, respectively, can be expressed as follows in terms of the radius $a$ from the center 0 of the semicircular part A to the center electrode 22 and the thickness C of each of the piezoelectric pieces 20 and 21.

$$l\,1 = \pi\ (a + C/2)$$
$$l2 = \pi\ (a - C/2) \qquad (7)$$

When a voltage V is applied on the terminals 25 and 26, the piezoelectric pieces 20 and 21 undergo variations in length $l1$ and $l2$, which have the following relationships.

$$\Delta l1/l1 = d_{31}\cdot V/2C \quad (8)$$

$$\Delta l2/l2 = d_{31}\cdot V/2C \quad (9)$$

As a result of these variations in length, the semicircular figure A shown in FIG. 3A is deformed into the state A′ shown in FIG. 3B.

In terms of the radius of curvature R and center angle $\phi$ after deformation to the state indicated in FIG. 3B, the following relationships are obtained.

$$l1 - \Delta l1 = \phi(R + C/2)$$
$$l2 + \Delta l2 = \phi(R - C/2) \quad (10)$$

From these equations, the following relationships can be obtained.

$$R = C\{(l1 + l2) - (\Delta l1 - \Delta l2)\}/2\ \{(l1 - l2) - (\Delta l1 + \Delta l2)\} \quad (11)$$
$$\phi = \{(l1 - l2) - (\Delta l1 + \Delta l2)\}/C \quad (12)$$

Then, by denoting by $r$ the distance $\overline{P'Q'}$ between the two ends P′ and Q′ of the bimorph of the shape A′, the following relationship is obtained.

$$r/2 = R \sin(\phi/2)$$

Accordingly, the elongation $\Delta r$ in the radial direction is as follows.

$$\Delta r = \overline{P'Q'} - \overline{PQ} = r - 2a = 2R\sin(\phi/2) - 2a$$

Then, since $\phi/2 \approx \pi/2$, $$\sin(\phi/2) \approx 1.$$

Therefore, $$\Delta r = 2R - 2a \quad (13)$$

By substituting the above Equation (11) and, in addition, Equations (7), (8), and (9), in Equation (13) and rewriting, the following equation is obtained.

$$\Delta r \approx [2a - d31\ (V/2)/1 - a/C^2\ d_{31}] - 2a \quad (14)$$

The amount of contraction or elongation of the bimorph 27 in assuming the states indicated by the intermittent lines 27a and 27b from the state indicated by full line in FIG. 2 will be denoted by $\Delta l$. Since this amount of contraction or elongation $\Delta l$ is equal to the product of the quantity of contraction or elongation $\Delta r$ of the semicircular part A and the number $n$ of semicircles in contiguous combination, the following relationship is valid.

$$\Delta l = n\Delta r \approx n\ \{[2a - d_{31}V/2/1 - ad_{31}V/C^2] - 2a\} = [2an - nd_{31}V/2/1 - ad_{31}V/C^2] - 2an \quad (15)$$

Here, since $2an = l$, where $l$ is the total length of the bimorph 27, $$\Delta l \approx (l - nd_{31}V/2)/(1 - ad_{31}V/C^2) - l$$

This equation can be modified to obtain the following equation.

$$\Delta l \approx l - nd_{31}V/2 - l(1 - ad_{31}V/C^2)/1 - ad_{31}V/C^2 = (a/C^2\ ld_{31}V - nd31V/2)/(1 - a/C^2\ d_{31}V) \quad (16)$$

Since $a/C^2\ d_{31}V << 1$ and $nd_{31}V << a/C^2\ ld_{31}V$, the following equation is obtained.

$$\Delta l \approx a/C^2\ ld_{31}V \quad (17)$$

By dividing this Equation (17) by Equation (1) of the quantity of elongation or contraction $\Delta lo$ of the piezoelectric pieces 20 and 21 in independent state, the following equation is obtained.

$$\Delta l/\Delta lo = a/C^2\ ld_{31}V/lo/Co\ d_{31}\ V \quad (18)$$

When $l$ is made equal to $lo$, and C equal to $Co$, in order to unify the conditions, $$\Delta l/\Delta lo = a/C \quad (19)$$

Then, when the thickness of the piezoelectric pieces 20 and 21 is made $10^{-4}$m and the radius $a$ of semi-circle A is made $5 \times 10^{-3}$m, $$\Delta l/\Delta lo = 5 \times 10^{-3}/10^{-4} = 50$$

That is, the length variation $\Delta l$ of the wave form bimorph 27 becomes 50 times the length variation $\Delta lo$ of the piezoelectric pieces 20 and 21.

Figure 4:
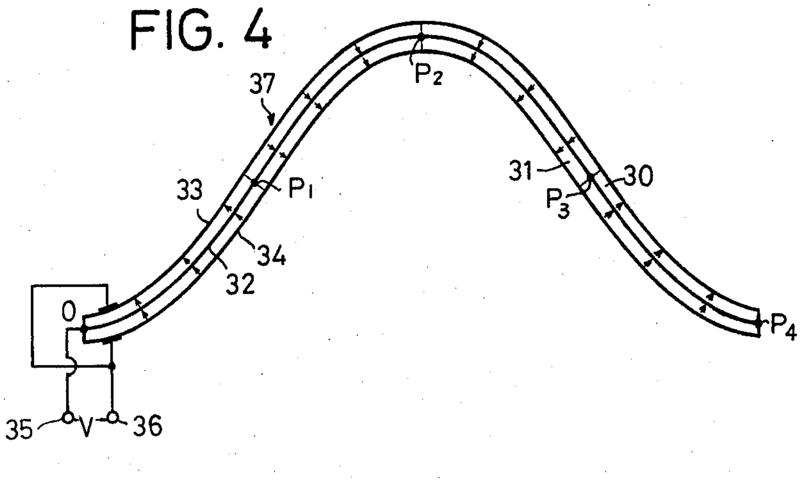
FIG. 4 is a similar longitudinal section showing a second embodiment of a curved piezoelectric element according to the invention.

In a second embodiment of a curved piezoelectric element according to the invention as diagrammatically shown in FIG. 4, the bimorph is of sinusoidal shape, differing from that of the bimorph of the above described first embodiment, which is a contiguous alternate connection of semicircular parts of alternately opposite orientation.

The bimorph 37 of this second embodiment comprises, essentially, upper and lower piezoelectric pieces 30 and 31, a center electrode 32 sandwiched therebetween and adhering to the piezoelectric pieces, and electrodes 33 and 34 fixed respectively to the upper surface of the piezoelectric piece 30 and the lower surface of the piezoelectric piece 31. The polarization directions of the piezoelectric pieces 30 and 31 are respectively and mutually inverted at the inflection points P1 and P3 of the sine wave of the bimorph. In the instant embodiment, as indicated by arrows, the polarization direction is upward in the parts below the inflection points P1 and P3 and downward in the parts above the inflection points. The center electrode 32 is connected to a terminal 35, while the electrodes 33 and 34 are connected to a terminal 36. A voltage V is applied across the terminals 35 and 36.

When, with the left end 0, as viewed in FIG. 4, of this bimorph 37 in a fixed state, the voltage V is applied across the terminals 35 and 36, the piezoelectric pieces 30 and 31 elongate or contract. For example, when the part between 0 and P1 of the piezoelectric piece 30 contracts, as a supposition, the part between 0 and P1 of the piezoelectric piece 31 elongates. Consequently, the part between O and P1 of the bimorph 37 deflects upward. Furthermore, since the polarization directions of the piezoelectric pieces 30 and 31 are reversed on opposite sides of the inflection point P1, the piezoelectric piece 30 elongates in the interval between P1 and P3, while the piezoelectric piece 31 contracts in the interval P1 – P3. As a result, the curvature of the bimorph 37 in the interval P1 – P3 increases. Since the polarization directions of the piezoelectric pieces 30 and 31 again becomes inverted at the inflection point P3, the bimorph similarly deflects in the direction which results in an increase in the curvature.

Figure 5:
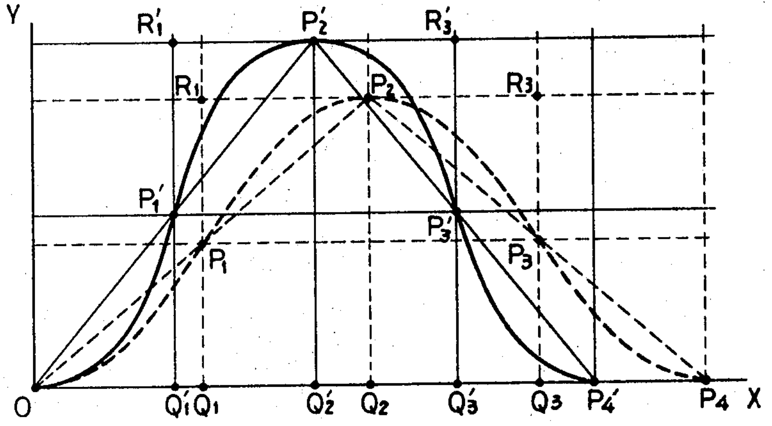
FIG. 5 is a graphical diagram indicating the manner in which the curved piezoelectric element shown in FIG. 4 deforms and deflects.

As a total result of the above described deformations of the bimorph 37, its state is transformed from that indicated by intermittent line to that indicated by full line in FIG. 5. In FIG. 5, the curve OP1 and the curve P1 P2 are symmetrical with respect to the inflection point P1. Accordingly, the triangle OP1Q1 and the triangle P2P1R1 are also symmetrical with respect to the point P1. Since these relationships do not change even when the bimorph changes its shape, the curve OP'1 and the curve P'1P'2 are symmetrical with respect to the inflection point P'1, and the triangle OP'1Q'1 are also symmetrical with respect to the point P'1.

Furthermore, the curve P2P3 is transformed into the curve P'2P'3 symmetrical to the curve P'2P'1 with respect to the straight line Q'2 P'2 as a result of the deformation of the bimorph, and the curve P4 P3 is also transformed into the curve P'4 P'3 symmetrical to the curve P'2 P'3 with respect to the point P'3. Consequently, the triangle P'2 P'3 R'3 becomes symmetrical to the triangle P'2 P'1 R'1 with respect to the line Q'2 P'2, and the triangle P'4 P'3 Q'3 becomes symmetrical to the triangle P'2 P'3 R'3 with respect to the point P'3. Therefore, the triangle P'4 P'3 Q'3 becomes symmetrical to the triangle 0 P'1 Q'1 with respect to the line Q'2 P'2.

The foregoing considerations constitute a proof that the point P'4 is disposed on the line O P4, that is, on the X axis, whereby it is apparent that the free end P4 of the piezoelectric element undergoes displacement along the line joining the fixed end 0 and the free end of the element in accordance with the deformation thereof.

For this displacement of the free end P4 of the bimorph 37 along the line joining the fixed end 0 and the free end P4, the following necessary conditions may be enumerated as being requisite.

1. The bimorph has a shape in the longitudinal section thereof of a curve.

2. This curve has one centerline of symmetry and two points of symmetry disposed on opposite sides of this centerline of symmetry.

3. The bimorph has a shape which is curved in the same direction and by the same amount of the two opposite sides of this centerline of symmetry and is curved in opposite directions and by the same amount on opposite sides of each of the points of symmetry.

In both of the aforedescribed first and second embodiments of the invention, the above enumerated conditions are fulfilled.

Figure 6:
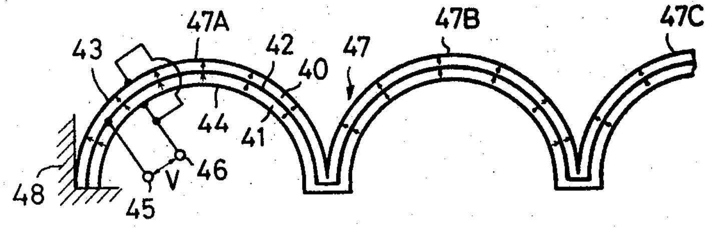
FIG. 6 is another longitudinal section showing a third embodiment of a curved piezoelectric element of the invention.

In a third embodiment of a curved piezoelectric element according to the invention as diagrammatically illustrated in FIG. 6, piezoelectric pieces 40 and 41 are bonded to a center electrode 42 sandwiched therebetween. The piezoelectric pieces 40 and 41 form semicircular structures 47A, 47B, 47C, . . . , successively and contiguously joined in one body, all having their concabe side on the lower side of the resulting element 47. The upper surface of the piezoelectric piece 40 and the lower surface of the piezoelectric piece 41 are respectively provided with outer electrodes 43 and 44 bonded thereonto. A voltage V is applied across a terminal 45 connected to the center electrode 42 and a terminal 46 connected to the outer electrodes 43 and 44 during operation. The piezoelectric pieces 40 and 41 are polarized in the outward direction as indicated by arrows.

Figure 7:
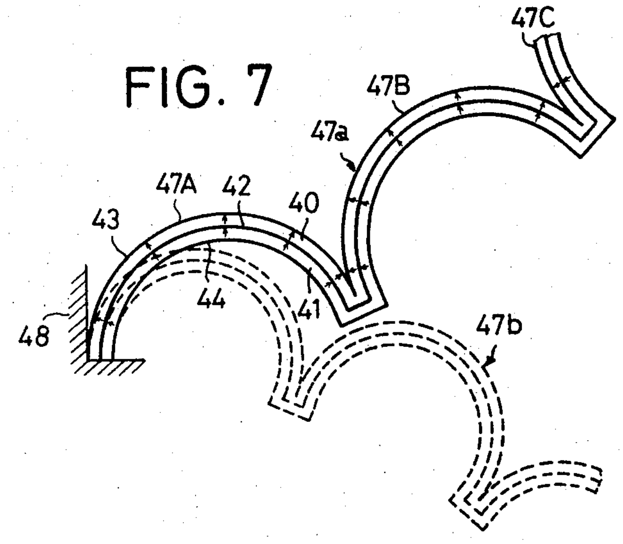
FIG. 7 ia a longitudinal section indicating the manner in which the curved piezoelectric element shown in FIG. 6 deforms and deflects.

The left end of the bimorph 47 of the above described structure is fixed to a stationary structure 48, whereby the bimorph is in a cantilever state. Then, when the voltage V is applied across the terminals 45 and 46, and the piezoelectric piece 40 contracts, depending on the polarity of this voltage, the piezoelectric piece 41 elongates. Consequently, the radii of curvature of the semicircular parts 47A, 47B, 47C, . . . , of the bimorph 47 increase, and the bimorph is deformed from its shape shown in FIG. 6 to that indicated by full line 47*a* in FIG. 7. On the other hand, when the polarity of the voltage V applied across the terminals 45 and 46 is reversed, the piezoelectric piece 40 elongates, while the piezoelectric piece 41 contracts, whereby the bimorph 47 is deformed as indicated by the broken line 47*b*.

At the free end of the bimorph 47, a displacement of a quantity corresponding to the sum of the respective deformations of all of the semicircular parts 47A, 47B, 47C, . . . is derived as output.

Since the effective length of the piezoelectric pieces 40 and 41 is $l\cdot\pi/2$, where $l$ is the length between the fixed and free ends of the bimorph 47, the length of the piezoelectric pieces in the instant embodiment is $\pi/2$ times that of a conventional piezoelectric element of flat-plate shape. Accordingly, the displacement of the free end is also approximately $\pi/2$ times that in the conventional element.

A fourth embodiment of a curved piezoelectric element according to the invention, which is a modification of the third embodiment illustrated in FIG. 6, is shown in FIG. 8. The bimorph 50 of this element comprises upper and lower piezoelectric pieces 51 and 52, a center electrode 53 sandwiched therebetween and bonded to these piezoelectric pieces, and outer electrodes 54 and 55 bonded respectively to the outer surfaces of these piezoelectric pieces. Geometrically as viewed in side view, this bimorph 50 is made up of semicircular parts 50X, 50Y, . . . joined by flat-plate parts 50R, 50S, . . . interposed alternately therebetween in one body. In this case, also, the displacement of the free end of the element fixed at the other end is very much greater than that of a piexoelectric element of flat-plate shape.

In a fifth embodiment of a curved piezoelectric element of the invention as shown in FIG. 9, the element is of double-bimorph structure wherein two bimorphs, each of the waveform shape of the first embodiment shown in FIG. 2, are contacted together and fixed at the crests X, Y, and Z of their respective corresponding waves. Of the double bimorph, one bimorph 60*a* comprises, essentially, piezoelectric pieces 61*a* and 62*a* and electrodes 63*a*, 64*a*, and 65*a* and has a waveform similarly as in the first embodiment illustrated in FIG.

2. The other bimorph 60*b* also comprises, essentially, piezoelectric pieces 61*b* and 62*b* and electrodes 63*b*, 64*b*, and 65*b*. The elongations and contractions of the bimorphs 60*a* and 60*b* are mutually opposite.

Since the quantity of elongation or contraction $\Delta l$, or the variation in length, of each of the waveform bimorphs 60*a* and 60*b* is very large as described hereinbefore, the displacement $\Delta y2$ of the free end of this double bimorph fixed at its other end is very much greater than the displacement $\Delta y1$ of the conventional piezoelectric element as shown in FIG. 1. This large displacement $\Delta y2$ can be calculated similarly as in the case illustrated in FIG. 1 to obtain the following equations.

$$\Delta y2 = al^2/4C^3\, d_{31}V$$

$$\Delta y^2/\Delta y^1 = al^2 d_{31}\, V/4C^3/l^2 o d_{31}\, V/2C^2 o$$

For $l = lo$ and $C = Co$, the following relationship is obtained.

$\Delta y^2/\Delta y^1 = a/2C$ By substituting $a = 5 \times 10^{-3}$m and $c = 10^{-4}$m, the following solution is obtained.

$$\Delta y^2/\Delta y^1 = 5 \times 10^{-3}/2 \times 10^{-4} = 25$$

That is, by the use of the bimorph of the instant embodiment, a displacement which is 25 times that in a conventional bimorph can be obtained.

The relationship between the polarization directions of the piezoelectric pieces 61*a*, 62*a*, 61*b*, and 62*b* and the manner in which voltage is applied to the electrodes will now be described in conjunction with FIGS. 10A and 10B.

In the example illustrated in FIG. 10A, with respect to the piezoelectric pieces 61*a* and 62*a*, the polarization direction is upward (outward), as viewed in FIG. 10A and as indicated by arrows, in the crest part from the inflection points as centers, while in the other trough parts, the polarization direction is downward (inward) as indicated by the arrows. With respect to the piezoelectric pieces 61*b* and 62*b*, the polarization direction is upward (inward) as indicated by arrows in the trough part from the inflection points as centers, while in the other crest parts, the polorization direction is downward (outward) as indicated by the arrows. The center electrodes 63*a* and 63*b* are connected to a terminal 66, while the four outer electrodes 64*a*, 65*a*, 64*b*, and 65*b* are connected to a terminal 67. During operation, a voltage is applied across the terminals 66 and 67.

In the example illustrated in FIG. 10B, with respect to the piezoelectric pieces 61*a* and 62*a*, the polarization is in the same direction as that of the piezoelectric pieces 61*a* and 62*a* in the example shown in FIG. 10A. With respect to the piezoelectric pieces 61*b* and 62*b*, in the trough part from the inflection points as centers, the polarization direction is downward (outward) as viewed in FIG. 10B and as indicated by arrows, while in the other crest parts, the polarization direction is upward (inward) as indicated by the arrows. In this case, the outer surface electrodes 64*a* and 65*a* of the bimorph 60*a* and the center electrode 63*b* of the bimorph 60*b* are connected to a terminal 68, while the outer surface electrodes 64*b* and 65*b* of the bimorph 60*b* and the center electrode 63*b* of the bimorph 60*a* are connected to a terminal 69. During operation, a voltage is applied across the terminals 68 and 69.

While, in the embodiment illustrated in FIG. 9, the bimorph waveform comprises semicircular figures in consecutively connected state, the bimorph waveform of the invention is not so limited, it being possible also to form a bimorph waveform comprising sinusoidal figures, as shown in FIG. 4, in consecutively connected state in one body.

Wave-shaped bimorphs can be produced according to the invention as described below with respect to one embodiment.

Figure 11:
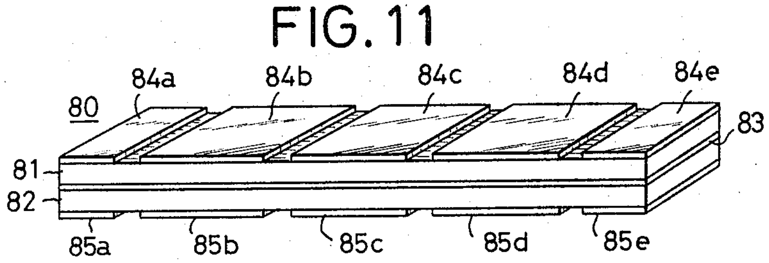
FIG. 11 is a perspective view showing one example of a piezoelectric element of flat-plate shape prior to forming into a curved piezoelectric element.

Referring to FIG. 11 showing a bimorph 80 of flat-plate shape in an intermediate stage of manufacturing of a wave-shaped bimorph, the bimorph has a base structure of piezoelectric sheets 81 and 82 and a center electrode 83 sandwiched therebetween and bonded thereto. The piezoelectric sheets 81 and 82 are made of a thermoplastic high-polymer, piezoelectric material or a composite material of a ferroelectric material and a high-polymer material. Electrodes 84*a* through 84*c* are formed with suitable spacing therebetween on the upper surface of the upper piezoelectric sheet 81 with orientational directions perpendicular to the longitudinal direction (left-right as viewed in FIG. 11) of the sheet 81. Electrodes 85*a* through 85*e* are formed on the lower surface of the lower piezoelectric sheet 82 in positions immediately opposite those of the electrodes 84*a* through 84*e*, respectively, these electrodes are formed by metal evaporation deposition process in which a mask is used.

Figure 12:
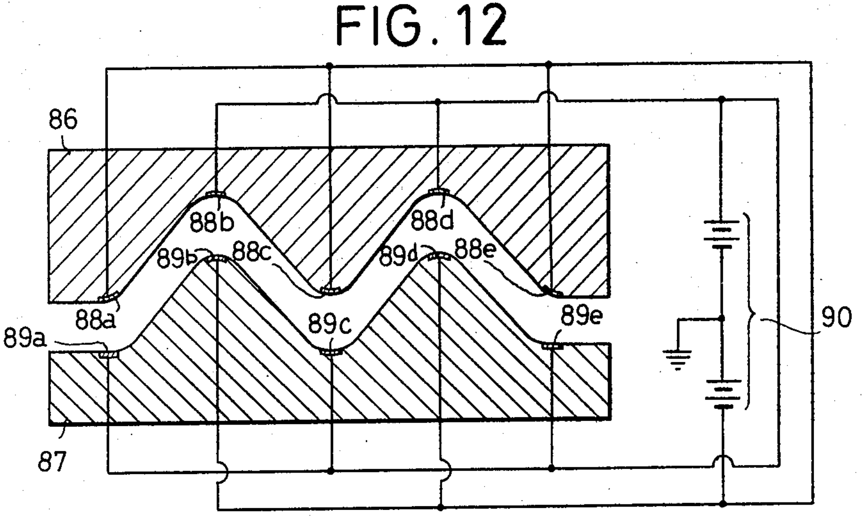
FIG. 12 is a schematic diagram indicating the general organization of a press for forming a curved piezoelectric element according to the invention.

This flat bimorph 80 is formed into a wave shape by means of a press as indicated in FIG. 12. The working part of this press comprises an upper die 86 and a lower die 87 having mutually opposed die surfaces of wave form, the crests of one die confronting corresponding troughs of the other die. These dies are made of electrically insulative material. Electrodes 88*a* through 88*e* and electrodes 89*a* through 89*e* are embeddedly installed in the crests and trough bottoms of the die surfaces of the upper and lower dies 86 and 87, respectively. Of these, the electrodes 88*b*, 88*d*, 89*a*, 89*c*, and 89*e* are connected to the positive pole of a power supply 90, while the electrodes 88*a*, 88*c*, 88*e*, 89*b*, and 89*d* are connected to the negative pole of the power supply 90.

In the press-forming operation, the upper and lower dies 86 and 87 are placed in an amply separated stete, and the flat bimorph 80 is interposed therebetween. Then, as the flat bimorph is heated, it is pressed between the upper and lower dies of the press. Thus the originally flat bimorph 80 is formed into a waveform conforming to the waveform of the die surfaces.

During this operation, the electrodes 88*a* through 88*e*, and 89*a* through 89*e* embeddedly installed in the upper and lower dies 86 and 87 contact the electrodes 84*a* through 84*e* and 85*a* through 85*e* provided on the upper and lower surfaces of the bimorph 80. Accordingly, the voltage of the power supply 90 is applied to the electrodes 84*a* through 84*e* and 85*e* through 85*e*, whereby the piezoelectric sheets 81 and 82 are polarized in the direction indicated by arrows in FIG. 13.

Figure 13:
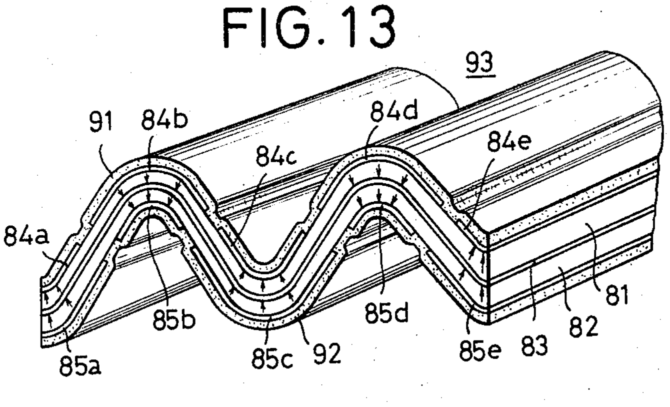
FIG. 13 is a fragmentary perspective view of a curved piezoelectric element fabricated by forming the piezoelectric element shown in FIG. 11 by means of the press shown in FIG. 12.

After the above described pressing step, the bimorph 80 thus pressed is cooled in its as-pressed state between the dies 86 and 87 with the voltage still applied to all electrodes. Thereafter, the dies 86 and 87 are separated, and the bimorph formed into a waveform is taken out from the press. In the bimorph thus press formed, the polarization established in the piezoelectric sheets 81 and 82 as described above remain. Then, by an evaporation deposition process, electrodes 91 and 92 are formed on the entire surface of the upper and lower sides of the bimorph, whereupon a waveform bimorph 93 as shown in FIG. 13 is completed.

Since the polarization is carried out during the heating and press-forming operation of the initially flat bimorph, a lowering of the piezoelectric modulus does not occur as in the case where forming is carried out after polarization. Furthermore, since the polarization direction differs within a single piezoelectric sheet 81 (or 82), a plurality of electrodes are not necessary for electrodes to be provided on one outer surface of the waveform bimorph, a single electrode being sufficient. In addition, the wiring for connecting the electrodes and the power supply is simple.

Next, some specific practical applying embodiments of the above described bimorphs will now be described.

An embodiment of a bimorph of the shape indicated in FIG. 8 is shown in FIG. 14, this bimorph being fixedly supported at both of its ends. When a voltage is applied across its center electrode 53 and outer electrodes 54 and 55, the direction of curvature of the entire bimorph is inverted each time the polarity of this applied voltage is reversed, whereby, as an overall effect, a vibration as between the broken lines 56 and 57 in FIG. 15 occurs.

A waveform bimorph according to the invention as described above can be applied to a loudspeaker of flat-plate type as described below with respect to an embodiment of a diaphragm as illustrated in FIGS. 16A and 16B. This diaphragm 58 has a sectional profile wherein semicircular parts extend between one pair of opposite side edges in directions parallel to the other pair of edges. A section of this bimorph 58 taken along a plane as indicated by line 59*a* – 59*b* perpendicular to the longitudinal directions of the semicircular crests has a shape as shown in FIG. 14.

In another embodiment of a diaphragm according to the invention as illustrated in FIG. 17, there are formed a plurality of semispherical parts 62 arranged in a honeycomb pattern wherein the apexes of the semispherical parts are alined in rows in three directions. A vertical section taken along any of these rows, for example, along the rows indicated by lines 61*a* – 61*b*, 61'*a* – 61'*b*, and 61''*a* – 61''*b*, has a shape as shown in FIG. 14.

Figure 18:
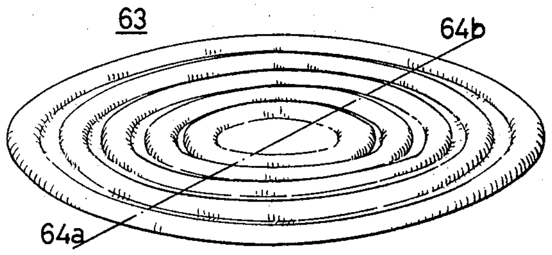
FIG. 18 is a perspective view showing a third embodiment of a loudspeaker diaphragm having sections each of a shape as shown in FIG. 14.

In still another embodiment of a diaphragm according to the invention as illustrated in FIG. 18, the diaphragm 63 has a plurality of annular waves of semicircular cross section in concentric arrangement. A vertical section taken along any diametrical line passing through the center of this diaphragm, e.g., line 64*a* – 64*b*, has a shape as shown in FIG. 14.

When a bimorph according to the present invention is used as a diaphragm in a loudspeaker of flat-plate type, a large vibration amplitude can be obtained, whereby a high sound pressure is produced. Furthermore, since a flexible piezoelectric sheet itself is used for the diaphragm, the matching with air is good, and a loudspeaker can be constructed with a simple structure.

The diaphragms described above and illustrated in FIGS. 16A, 17, and 18 may also be formed so that their sectional profiles in vertical section taken along the lines mentioned above will be of the same shape as that of the bimorph 60 shown in FIG. 9.

Figure 19:
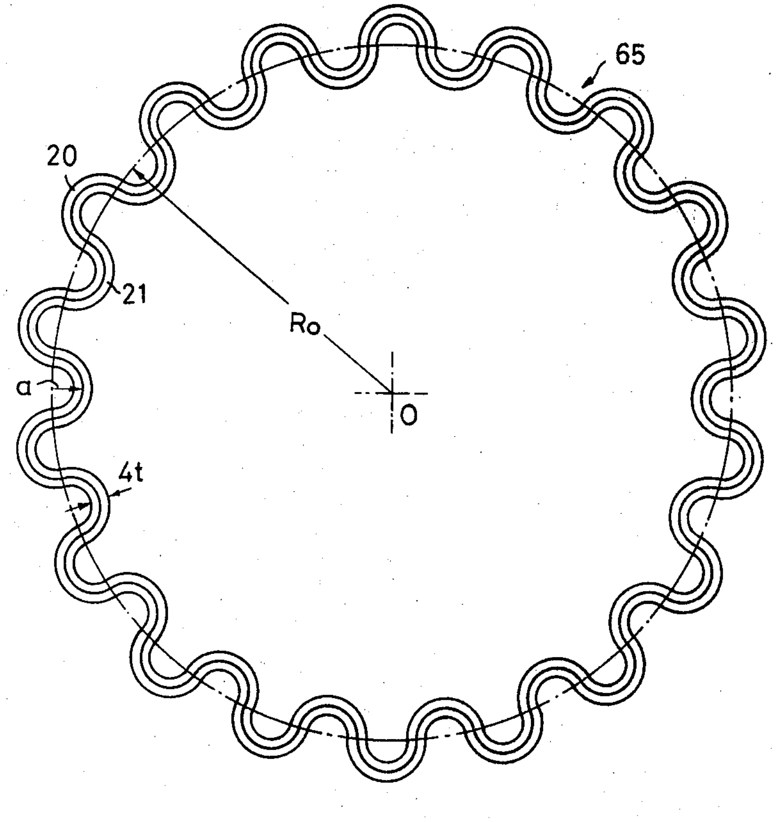
FIG. 19 is a sectional view of a loudspeaker diaphragm of a cylindrical form having a section a part of which has a shape as indicated in FIG. 2.

In a further embodiment of the invention as illustrated in FIG. 19, the diaphragm 65 has a sectional profile as shown in FIG. 2 and has the shape of a cylinder with a center 0 and a corrugated wall of an average radius R*o*. For the following analysis: the average radius of the semicircle forming the half wave of the shape of this cylindrical wall will be denoted by *a;* the total thickness of the laminated structure of the piezoelectric pieces 20 and 21 by $4t$; the length of one wavelength of the wave form by $\lambda$; and the average lengths along the arcs of the half wavelengths of the piezoelectric pieces 20 and 21 prior to deformation by $l1$ and $l2$, respectively. Then, $$l1 = \pi (a + t)$$
$$l2 = \pi (a - t) \tag{20}$$

Furthermore, by applying a voltage V on the terminals (terminals 25 and 26 in FIG. 2), elongations and contractions are produced in the piezoelectric pieces 20 and 21, and the semicircle A shown in FIG. 3A deforms into the shape as indicated by A' in FIG. 3B.

The radius of curvature R and the center angle $\phi$ after the deformation indicated in FIG. 3B can be expressed as follows by substituting $2t$ for C representing the thickness of the piezoelectric piece within each of Equations (11) and (12).

$$R = t\{(l1 + l2) - (\Delta l1 - \Delta l2) / (l1 - l2) - (\Delta l1 + \Delta l2)\} \tag{21}$$

$$\phi\{(l1 - l2) - (\Delta l1 + \Delta l2)\}/2t \tag{22}$$

Furthermore, by denoting the length of one wavelength after deformation by $\lambda'$, the following equation is obtained.

$$\lambda'/4 = R \sin (\phi/2)$$

Accordingly, by substituting the Equations (21) and (22) in this equation and simplifying, the following equation is derived.

$$\lambda' = 4t \{(l1 + l2) - (\Delta l1 - \Delta l2)\}/(l1 - l2) - (\Delta l1 - \Delta l2) \sin (l1 - l2) - (\Delta l1 + \Delta l2)/4t \tag{23}$$

In addition, by substituting Equation (20) and the equation indicating the elongation or contraction of the piezoelectric piece (an equation obtained by substituting $2t$ for C in Equations (8) and (9)) in this Equation (23) and simplifying, the following equation is obtained.

$$\lambda' = t(4a - d31V)/(t - a\ d31V/4t) \sin 2\pi(t - a\ d31V/4t)/4t \tag{24}$$

Then, since this diaphragm 65 is formed by consecutively connecting in alternate disposition n semicircular parts A as shown in FIG. 3A into a ring shape as viewed in section, the average outer circumferential length $2\pi Ro$ is $n\lambda$, and becomes $n\lambda'$ after deformation.

Accordingly, the variation R*o* in the average radius, that is, the difference between the average radius R*o*' of the cylindrical shape of FIG. 19 after deformation and R*o*, is as follows.

$$\Delta Ro = Ro' - Ro = n\lambda'/2\pi - n\lambda/2\pi = n/2\pi (\lambda' - \lambda) \tag{25}$$

Then, in the case where: $2t = 0.1$ mm; $d_{31} = 1 \times 10^{-12}$ C/N; $a = 5$ mm; V = 200V; $n = 50$; and $R = (1/2\pi)4an \approx 160$ mm, $$t >> a\ (d_{31}V/4t)$$

In the Equation (24), $$\sin 2\pi\ (t - r\ d31V/4t)/4t \approx \sin \pi/2 = 1$$

Therefore, the Equation (24) can be simplified as $$\lambda' = t(4a - d31V)/(t - a\ d31V/4t)$$

By substituting this in the Equation (25), the following equation for the variation $\Delta Ro$ in the average radius is obtained.

$$\Delta Ro = n/2\pi \quad t(4a - d31V)/(t - a\ d31V/4t) - 4a \qquad (26)$$

Then, when the above numerical values are substituted in this Equation (26), $$\Delta R \approx 1/2\pi \times 10^{-4}\ (m)$$

That is, the average radius varies approximate 16 microns.

On one hand, in the case where only a single piezoelectric piece is formed into a cylindrical shape with a radius coinciding with the average radius of the above described diaphragm 65, the outer circumference thereof becomes 4 *na*. When a voltage V is impressed on this piezoelectric cylinder, its outer circumference varies by 4 $na \cdot d31V/4t$. The corresponding variation $\Delta Ro'$ of the radius $Ro$ becomes $$\Delta Ro' = 4\ na/2\pi \cdot d31V/4t$$

When the numerical values set forth above are substituted in this equation, $$\Delta Ro' = 5/\pi \times 10^{-7}\ (m)$$

That is, the average radius varies approximately 0.16 micron.

When the variation $\Delta Ro$ of the average radius of the diaphragm shown in FIG. 19 and the variation $R'o$ of the radius of the above described diaphragm are compared as the ratio thereof.

$$\Delta Ro/\Delta Ro' = (1/2\pi \times 10^{-4})/(5/\pi \times 10^{-7}) \approx 100$$

Therefore, the diaphragm 65 of the construction shown in FIG. 19 produces a displacement which is approximately 100 times that of a diaphragm fabricated by simply forming a bimorph into a cylindrical shape for the same applied voltage.

In a further application of the cylindrical diaphragm shown in FIG. 19, it can be adapted to vary its diameter when a voltage is applied thereto by supporting this diaphragm at its upper and lower ends or at its middle part by means of a suitable damper member such as sponge rubber or elastic foamed plastic. Accordingly, by applying a signal voltage V with respect to the outer and inner piezoelectric pieces and the center electrode of the diaphragm 65, it becomes possible to cause the diaphragm 65 to undergo a vibration in accordance with the applied signal voltage. In this manner, a non-directional (or omnidirectional) loudspeaker for emitting sound with high efficiency over 360° of angle in horizontal directions can be obtained.

While the above described diaphragm 65 comprises a plurality of semicircular parts, each as shown in FIG. 2, connected consecutively and alternately, it can also be of a shape wherein a plurality of sine waves, each as shown in FIG. 4, are connected consecutively in one body. Furthermore, while a pair of piezoelectric pieces are bonded together respectively with coinciding polarization directions, the polarization directions may be mutually reversed. In this case, the center electrode foil is not absolutely necessary, and signal voltages are applied across the outer surface and inner surface electrode foils.

Figure 20A:
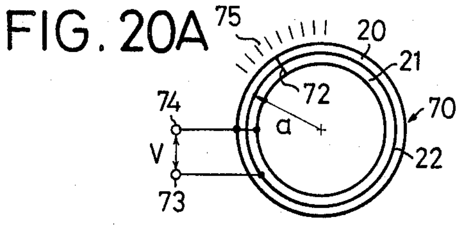
FIGS. 20A and 20B are respectively a plan view and a side view showing one embodiment of application of a curved piezoelectric element of the invention to a voltmeter.
Figure 20B:
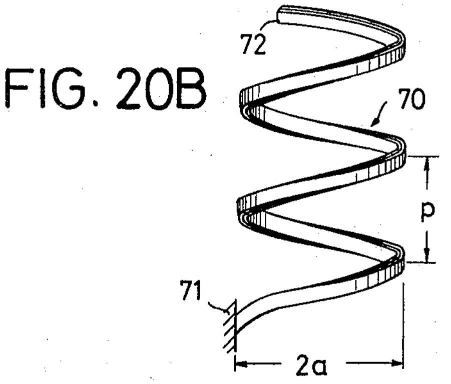

In a still further embodiment of the invention as illustrated in FIGS. 20A and 20B, a spiral bimorph 70 is applied to a direct-current voltmeter. The bimorph 70 comprises a plurality of semicircular parts A, each as shown in FIG. 3A, connected consecutively to form a long structure which is shaped into a helical shape of a pitch *p*. One end of this helical bimorph 70 is fixed to a stationary structure 71. For the following analysis, the average radius of the semicircle A of the semicircular parts will be denoted by *a*, the laminated thickness of the piezoelectric pieces 20 and 21 by $2c$, and the average lengths of the piezoelectric pieces 20 and 21 prior to deformation by $l1$ and $l2$. When a voltage V is applied to the terminals, the semicircle A shown in FIG. 3A deforms into the shape A' as shown in FIG. 3B, and the center angle $\phi$ at this time is represented by the Equation (12) set forth before.

$$\phi = \{(l1 - l2) - (\Delta l1 + \Delta l2)\}/C \qquad (12)$$

By substituting Equations (7) and (9) in this Equation (12), the following equation is obtained.

$$\phi = \pi - a\pi d_{31}V/C^2 \qquad (27)$$

Furthermore, in a bimorph made up of two semicircular parts A, each as shown in FIG. 3A, connected contiguously together in one body so that the fixed and free ends of the combination abut each other, the abutting surfaces of these ends separate because of the deformation of the bimorph when a voltage V is applied to the electrodes. The resulting separation angle $\Delta\theta$ between the fixed and free ends after deformation is given by the following equation.

$$\Delta\theta = 2(\pi - \phi) = 2a\pi d_{31}V/C^2 \qquad (28)$$

Then, if it is assumed that the bimorph 70 shown in FIG. 20 is made up of $2n$ semicircles A, each as shown in FIG. 3A, connected consecutively to form a helical structure of *n* layers, the total length *l* of helical bomorph 70 can be represented by the following equation $$l = 2\pi \sqrt{a^2 + (p/2\pi)^2} \cdot n$$

Then, when the radius *a* of this helix and the pitch *p* are related by $a >> p$, the total length *l* becomes $$l \approx 2\pi a \cdot n$$

Accordingly, the displacement angle $\theta n$ of the free end 72 of the bimorph 70 comprising circular bimorphs in *n* layers is proportional to the number of layers, and $$\theta n = \Delta\theta \cdot n$$

By substituting Equation (28) in the above equation, the following equation is obtained.

$$\theta n = (2\pi a n/C^2)\, d_{31} \cdot V \qquad (29)$$

Then, in the case of an applied voltage V of $10^2$(V), a thickness $c$ of each piezoelectric piece (20, 21) of $10^{-4}$(m), an average radius $a$ of $5 \times 10^{-2}$(m), a piezoelectric modulus $d_{31}$ of $2 \times 10^{-11}$(c/N), and a number of layers $n$ of 100, the following solution is obtained by substituting these numerical values in Equation (29).

$$\theta = 2\pi$$

That is, when a bimorph of this character of a total length $l = 2\pi a \cdot n = 31.4$(m) is formed into a helical structure of a radius of 5 cm and 100 layers, and a voltage of 100 V is applied to its input terminals 73 and 74, the free end 72 of this bimorph rotates through one revolution around a circumference of a circle of 5 cm radius. Therefore, by providing a calibrated scale 75 and reading the position of this free end after deformation of the bimorph, the value of the direct-current voltage applied to the terminals 73 and 74 can be conversely determined.

In this connection, as is apparent from the Equation (29) the displacement angle $\theta n$ of the free end 72 of the bimorph 70 is proportional to the applied voltage, and for this reason, the calibrated scale is linear with equally spaced divisions. Furthermore, a displacement angle $\theta n$ exceeding 360° presents no problem, and in this case, the scale 75 indicates two or more calibration scales.

The double bimorph 60 of the construction indicated in FIG. 9 may also be formed into a helical structure and applied to a direct-current voltmeter similarly as in the above described embodiment. In the case of the double bimorph 60, a displacement which is even greater than that of the bimorph 70 can be obtained for the same applied voltage.

Furthermore, by using the bimorph 70 or 60 the like as means for detecting voltage, a direct-current voltmeter having a high input impedance, excellent resistance to impact, and resistance to damage due to application of excessively high voltage and not requiring switching of measurement ranges can be obtained.

Figure 21:
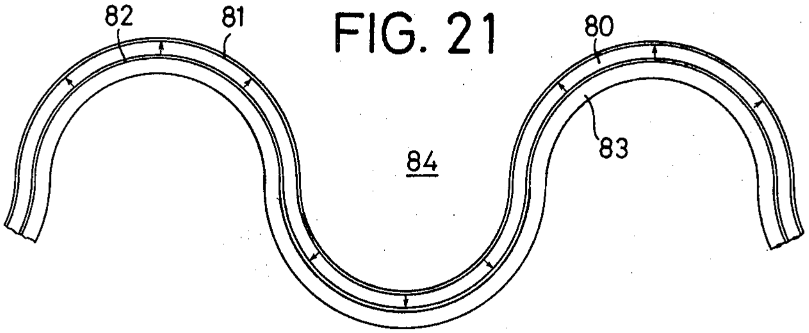
FIG. 21 is a longitudinal section showing a sixth embodiment of a curved piezoelectric element of the invention.

A sixth embodiment of a curved piezoelectric element of the invention, which is a modification of the first embodiment illustrated in FIG. 2, will next be described with reference to FIG. 21. This element has a piezoelectric piece 80 which has electrodes 81 and 82 deposited by evaporation on its two opposite surfaces and is polarized similarly as the piezoelectric piece 20 shown in FIG. 2, and which is made up of semicircular parts connected consecutively in alternate arrangement. A non-piezoelectric piece 83 is bonded to the surface of the electrode 82 opposite the piezoelectric piece 80. This non-piezoelectric piece or layer 83 can be formed, for example, by applying as a coating a solution of a high-polymer organic material dissolved in a solvent on the electrode 82 and thereafter evaporating off the solvent or by heating and melting a thermoplastic material and applying it similarly as a coating on the electrode 82. By carrying out a treatment for removing bubbles under a vacuum during this coating process, the development of bubbles in the product can be prevented. The above described piezoelectric piece 80, electrodes 81 and 82, and non-piezoelectric piece 83 constitute a bimorph 84.

Since the non-piezoelectric piece 83 does not elongate or contract when a voltage is applied thereto, the displacement or deflection of the bimorph 84 results from the elongation or contraction of the piezoelectric piece 80, whereby the magnitude of this deformation becomes a small value. However, this small deformation can be compensated for by using a material of high piezoelectric modulus for the piezoelectric pieces 80 or by amplifying the applied voltage. The bimorph 84 deforms uniformly as a result of even elongation and contraction of the piezoelectric piece 80 due to the voltage applied to the electrodes 81 and 82 adhering intimately thereto and, further, as a result of intimate adherence of the non-piezoelectric piece 83.

The non-piezoelectric piece 83 may be formed by application thereof as a coating in molten state as mentioned before, but alternatively, it can also be applied by rendering it into sheet form and then bonding it to the piezoelectric piece 80 in a manner similar to the bonding together of a pair of piezoelectric pieces as indicated in FIG. 2. In this case, the intimate adhesiveness between the non-piezoelectric piece 83 and the electrode 82 is not improved, but since there is no necessity of applying an electric field to the non-piezoelectric piece 83 by utilizing the electrode 82, there is no possibility of nonuniform elongation and contraction due to deficient electric field strength caused by deficient adhesion of the electrode 82. However, since there is a possibility of uneven deformation of the bimorph 84 due to deficient adhesion of the non-piezoelectric piece 83 to the piezoelectric piece 80, the formation of the non-piezoelectric piece 83 by the application thereof in molten form as a coating on the piezoelectric piece 80 is preferable.

Since the non-piezoelectric piece 83 is not required to possess a piezoelectric property, the material therefor can be selected from a relatively wide range of materials. Particularly when a transparent material is selected, the electrode 82 can be observed through the non-piezoelectric piece 83, whereby it is possible to inspect the degree of intimate adhesion between the non-piezoelectric piece 83 and the electrode 82. Furthermore, by utilizing the light transmitting characteristic of the non-piezoelectric piece 83, the vibratory characteristic of the bimorph 84 can be observed.

Figure 22:
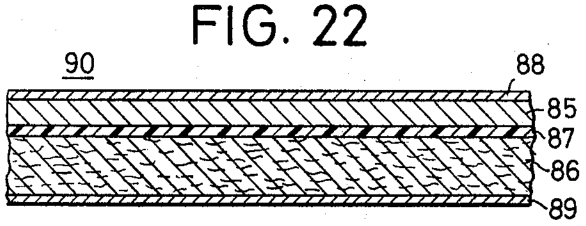
FIG. 22 is a fragmentary, enlarged, sectional view showing the sectional structure of a seventh embodiment of piezoelectric element of the invention.

In a seventh embodiment of a piezoelectric element according to the invention as illustrated in FIG. 22, a material 85 (piezoelectric structure) which is a high-polymer material having a piezoelectric characteristic or a composition of this high-polymer material and fine particles of a ferroelectric material is bonded to a high-polymer material 87 of excellent adhesiveness adhering to one surface of a sheet of paper 86. Accordingly, the piezoelectric structure 85 is adhering closely to the paper 86. Electrodes 88 and 89 are respectively bonded intimately to the upper surface of the piezoelectric structure 85 and the lower surface of the paper 86. Thus a bimorph 90 is formed.

Since the paper 86 in this bimorph 90 is light in weight and, moreover, has a high Young's modulus, the resulting bimorph 90 can be made to have a high Young's modulus and a small mass. Therefore, when this bimorph 90 is used as the diagram of a loudspeaker or the like, excellent response can be obtained over a wide sound range of from low frequencies to high frequencies.

In the above described embodiment, the bimorph 89 is shown to have a planar shape, but it can be formed to have a curved shape as in any of the above described embodiments.

Further, this invention is not limited to these embodiments but various variations and modifications may be made without departing from the scope and spirit of the invention.

What we claim is:

1. A curved piezoelectric element comprising two layers at least one of which has the characteristic of deforming in response to a voltage applied thereto, a center electrode interposed between said two layers, and at least one outer electrode bonded to the outer surface of said piezoelectric structure, said two layers and said electrodes being integrally formed in one body into a shape comprising at least two half-wave parts of waveform connected integrally and contiguously in one body, said center electrode and said outer electrodes being adapted to receive a voltage applied thereacross during operation.

2. A curved piezoelectric element according to claim 1 in which said piezoelectric structure has a section having a shape essentially of at least one wavelength of said waveform.

3. A curved piezoelectric element according to claim 2 in which said waveform is a sinusoidal waveform.

4. A curved piezoelectric element according to claim 2 in which said waveform comprises a plurality of semicircular parts of mutually opposite directions of curvature alternately connected in consecutive succession.

5. A curved piezoelectric element according to claim 1 in which said piezoelectric structure has a section having a shape comprising a plurality of semicircular parts connected integrally in succession.

6. A curved piezoelectric element comprising two piezoelectric structures having the characteristics of deforming in mutually opposite directions in response to a voltage applied thereto and each having a waveform comprising a plurality of semicircular parts of mutually opposite directions of curvature alternately connected in consecutive succession, said two piezoelectric structures being fixed together at the apexes of the crests of the waveforms thereof.

7. A curved piezoelectric element having a bimorph structure and comprising two piezoelectric structures, a center electrode interposed between said two piezoelectric structures, and two outer electrodes bonded respectively to the outer surfaces of the two piezoelectric structures, said two piezoelectric structures and said electrodes being integrally formed in one body into a shape comprising essentially at least two half-wave parts of a waveform connected integrally in contiguous succession, said center electrode and said outer electrodes being adapted to receive a voltage applied thereacross during operation.

8. A curved piezoelectric element comprising a piezoelectric structure, two electrodes bonded onto opposite surfaces of said piezoelectric structure, and a non-piezoelectric structure secured to the piezoelectric structure with one of said electrodes interposed therebetween, said piezoelectric structure, electrodes, and non-piezoelectric structure being integrally formed into a shape comprising essentially at least two half-wave parts of a waveform connected in consecutive succession, said electrodes being adapted to receive a voltage applied therecross during operation.

9. A curved piezoelectric element comprising at least one piezoelectric structure which is deformably responsive to a predetermined voltage applied thereto, said piezoelectric structure having a section the shape of which defines a plurality of integrally interconnected portions and flat portions, said flat portions being interposed alternately between said semicircular portions.

10. A curved piezoelectric element comprising at least one piezoelectric structure which is deformably responsive to a voltage applied thereto, said structure having a waveform shape and extending to at least one wavelength of said waveform to define a series of alternately interconnected crest portions and trough portions of said structure which crest portions and trough portions are polarized in mutually opposite directions.

* * * * *